G. L. ROGERS.
CHUCK FOR HOLDING FILE BLANKS.
APPLICATION FILED DEC. 6, 1917.
1,277,128.
Patented Aug. 27, 1918.
2 SHEETS—SHEET 2.
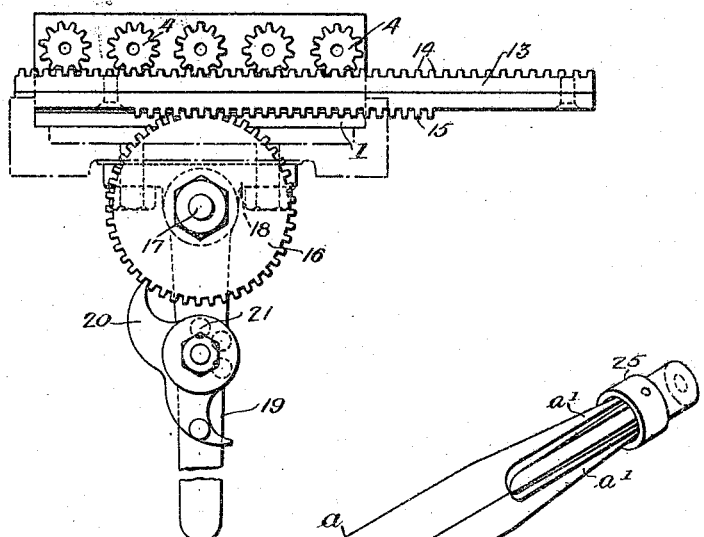
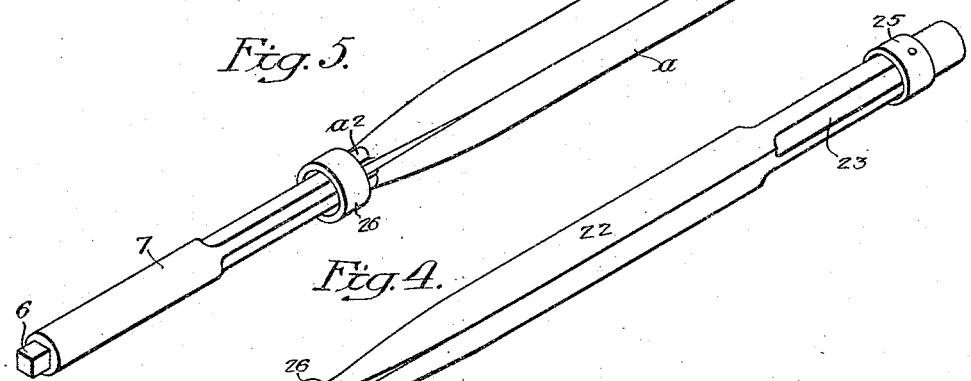
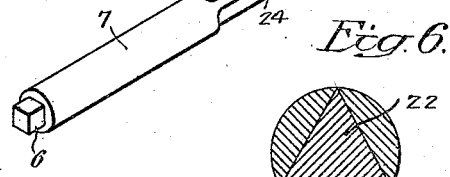
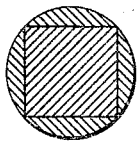 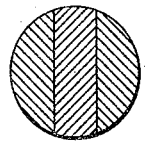
Inventor;
George L. Rogers,
by his Attorneys.

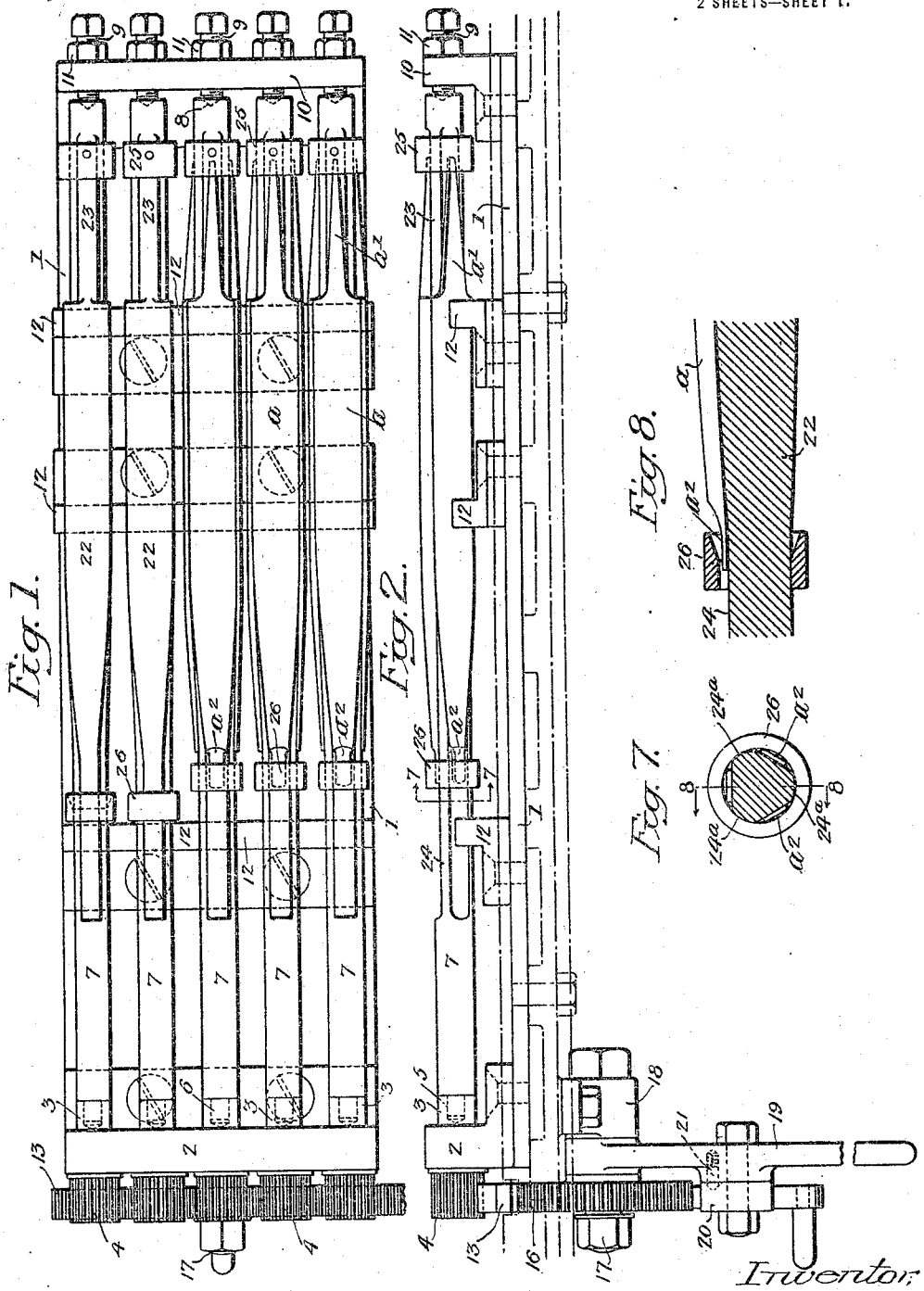

UNITED STATES PATENT OFFICE.

GEORGE L. ROGERS, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

CHUCK FOR HOLDING FILE-BLANKS.

1,277,128.      Specification of Letters Patent.      Patented Aug. 27, 1918.

Application filed December 6, 1917. Serial No. 205,782.

*To all whom it may concern:*

Be it known that I, GEORGE L. ROGERS, a citizen of the United States, residing in Philadelphia, Pennsylvania, have invented certain Improvements in Chucks for Holding File-Blanks, of which the following is a specification.

The object of my invention is to construct a chuck which is capable of holding files during the process of manufacture.

The invention is particularly adapted for holding half round files, and the main feature of the invention is to design the chuck so that a plurality of files can be held thereon in order that they may be mounted in the machine in which the chuck is rotated during the grinding, stripping and cutting processes.

In the accompany drawings:—

Figure 1, is a plan view showing a series of chucks made in accordance with my invention and mounted on a carriage;

Fig. 2, is a side view of the carriage and chuck shown in Fig. 1;

Fig. 3, is an end view;

Fig. 4, is a detached perspective view of one of the chucks;

Fig. 5, is a perspective view of the chuck, showing the file blanks in position;

Fig. 6, is a transverse sectional view of the chuck shown in Fig. 5;

Fig. 7, is a sectional view on the line 7—7, Fig. 2;

Fig. 8, is a longitudinal sectional view on the line 8—8, Fig. 7; and

Figs. 9 and 10, are views illustrating modifications of the invention.

Referring to the drawings, 1 is a base having a bearing 2 at one end in which is mounted a series of spindles 3 having pinions 4 at one end and a square socket 5 at the opposite end for the reception of a similarly shaped pin 6 on the chuck 7. At the opposite end of the chuck is a central recess 8 into which projects the end of a center screw 9 on the bearing 10 and held in place by a nut 11. In the present instance I have shown five chucks mounted in the frame and these chucks are supported intermediate the ends by recessed bearings 12 adjustable on the base 1; being held in place by screws shown by dotted lines in Figs. 1 and 2.

Meshing with the pinions 4 on the spindles 3 is a rack 13 having teeth 14 and 15. The teeth 14 mesh with the pinions 4, while the teeth 15 mesh with a toothed wheel 16 on a stud 17 carried by a bearing 18 projecting from the base 1. 19 is an arm mounted on the stud 17, and pivotally mounted on this arm is a pawl 20 arranged to engage the teeth of the wheel 16. The arm can be turned by hand and the pawl will feed one or more teeth at a time, according to the swing of the arm, and this movement turns the spindles through the rack and pinions, which turn the chucks on which the files are mounted. The pawl 20 can be set and held in the set position by a spring pin 21, which is adapted to any one of three recesses, in the present instance, in the pawl. While I have illustrated the arm 19 as moved by hand to operate the pawl, power may be applied so as to move the rack and turn the spindles in unison, as desired.

Each spindle is an elongated prismatic structure having flat faces on which the file blanks are mounted, and, as shown in Figs. 4 and 6, the body portion 22 of each spindle is triangular in shape and each end is cut away, as at 23 and 24. A fixed collar 25 is secured to one end 23 of the spindle and is arranged to receive the tang $a'$ of the file blank $a$, while a sliding collar 26, located on the portion 24, is adapted to engage the point end $a^2$ of the file blank. The cylindrical sliding collar 26 is arranged to slide on the portion 24 of the chuck and as the chuck is triangular, as shown in Fig 7, it leaves considerable space for the reception of the point end of the file blank, and this collar 26 is tapered, as shown in Fig. 8, so that it can be driven over the point end of the file blank. This draws the file firmly onto the chuck, holding it rigidly in position. The portions $24^a$ of the chuck retain the ring 26 in the central position.

It will be noticed that when the spindle is made triangular and three files are applied, the assembled elements define a surface having a circular cross section, so that the blanks can be rotated against a grind stone for the purpose of grinding the surface of the file, or can be stripped in preparing the blanks for the cutting process. The stripping consists in filing or scraping the blanks so as to remove any particles of the grind stone or emery wheel which would be likely to adhere to the surface of the file. The chuck can also be used for holding the blanks during the cutting process.

The standard half round file has a cross section, similar to that shown in Fig. 6, so that a triangular chuck holds three files, but, in some instances, the cross section of the files may be modified. A thin file may be so proportioned that the chuck can have a rectangular body portion, as shown in Fig. 9, and four files can be held in position. Where the file is thick in cross section, as in Fig. 10, then the body portion of the chuck can be arranged to receive two files. The chuck illustrated will accommodate files varying slightly in length, but I prefer to make a series of chucks adapted to files of various sizes and contour.

In operating the device, a number of chucks and file blanks can be assembled and the chucks placed in position on the frame. If the blanks are to be ground, the frame is located in the proper position in front of a grind stone and the chucks are turned so as to present the entire surface to the action of the stone. When the work on these blanks is completed the chucks are removed and other chucks are placed in position and the operation is repeated.

Chucks with the blanks attached can be taken from the grinding machine and located in the frame of a stripping machine, in which the surface is filed or scraped prior to the blank being cut in an ordinary file cutting machine to which the chuck and the blanks are carried from the stripping machine. In some instances, a series of chucks may be used in connection with each machine, in which case the blanks are detached from the chucks after each operation.

I claim:—

1. A chuck for holding a plurality of half-round file or other blanks consisting of an elongated, prismatic body portion and means for holding the flat surfaces of the blanks against the flat surfaces of the body portion so that the curved surfaces of the blanks are within a single cylindrical surface; and means for rotating the chuck.

2. A chuck for holding a plurality of half-round file or other blanks; a body portion having two or more flat surfaces for the reception of the file blanks; a single means at each end of the chuck for holding all of the blanks onto the flat surfaces; and means for rotating the chuck.

3. The combination of a chuck for holding half round file blanks, said chuck having a body portion triangular in cross section and adapted to receive three files; and means at each end of the body portion for holding the files to said body portion.

4. The combination in a chuck, of a triangular body portion adapted to receive a series of three files; a fixed sleeve at one end of the body portion adapted to receive the tang of the files; and a sliding sleeve at the other end adapted to engage the point end of the files.

5. The combination of a base; bearings thereon; a spindle mounted in one bearing and having a pinion at one end and a socket at the opposite end; a screw mounted in the other bearing; a chuck having a pin adapted to the socket in the spindle and arranged to be held by the screw in the other bearing, said chuck being shaped to receive two or more files; means for holding the blanks in position; and means for turning the spindle.

6. The combination of a base; bearings thereon; a spindle mounted in one bearing and having a pinion at one end a socket at the opposite end; a screw mounted in the other bearing; a chuck having a pin adapted to the socket in the spindle and arranged to be held by the screw in the other bearing, said chuck being shaped to receive two or more files; means for holding the blanks in position; a double toothed rack, one set of teeth engaging the teeth of the spindle; a wheel engaging the other set of teeth; an arm carrying a pawl arranged to engage the teeth of said wheel so as to give it motion in one direction, causing the spindles to turn to present fresh surfaces to the device acting upon the blanks.

7. The combination of a base; a bearing at each end of the base; a series of spindles arranged side by side in one of the bearings, each spindle having at one end a pinion and a socket at the opposite end, the other bearing having a series of screws; a series of chucks, each of said chucks having a pin at one end arranged to enter the socket in a spindle and recessed at the opposite end to receive the end of a screw carried by the other bearing, each chuck having at one end a fixed collar adapted to engage the tang of the file and having at the other end a sliding collar arranged to engage the point of the file; a series of supports for the chuck, said supports being mounted on the base; and means for rotating the spindles and the chucks.

8. The combination of a frame; a series of spindles mounted on the frame; means for driving the spindles in unison; a series of chucks, also mounted on the frame and coupled to the spindles, each chuck having two or more surfaces for the reception of half round file blanks, the chuck having means for holding the blanks to the surfaces, the curved portions of the blanks defining a surface of circular cross section when the blanks are assembled on the chuck.

9. The combination of a frame; a series of spindles mounted on the frame; a series of chucks driven by the spindles, said chucks being shaped to receive two or more file blanks, each spindle having a pinion; a rack bar having teeth on each side, one set of teeth meshing with the teeth of the pinions; a toothed wheel engaging the other set of teeth of the rack; a pivoted arm; and a pawl on the arm engaging the wheel so that on reciprocating the arm the wheel will be turned, imparting rotary motion to the chucks.

10. The combination in a chuck, of a body portion triangular in cross section and forming three surfaces for the flat portion of the file blank; a fixed cylindrical collar at one end of the chuck for holding one end of the file blank; and a sliding cylindrical collar at the opposite end for holding the other end of the file blank, said collar having an internal beveled portion.

In witness whereof I affix my signature.

GEORGE L. ROGERS.

Copies of this patent may be obtained for five cents each, by addressing the "Commissioner of Patents, Washington, D. C."